United States Patent [19]

Nurnberg

[11] 4,125,107

[45] Nov. 14, 1978

[54] UNIVERSAL DIFFERENTIAL THERMOSTAT FOR SOLAR HEATING SYSTEM

[75] Inventor: Richard K. Nurnberg, Norristown, Pa.

[73] Assignee: Robertshaw Controls Company, Richmond, Va.

[21] Appl. No.: 741,093

[22] Filed: Nov. 11, 1976

Related U.S. Application Data

[63] Continuation-in-part of Ser. No. 679,286, Apr. 22, 1976.

[51] Int. Cl.² ............................................. F24J 3/02
[52] U.S. Cl. ................................ 126/270; 126/400; 237/1 A; 165/18
[58] Field of Search .................. 126/270, 271, 400; 237/1 A; 165/18, 19, 22, 32

[56] References Cited

U.S. PATENT DOCUMENTS

| 3,388,860 | 1/1968 | Kruper | 236/1 |
| 3,931,806 | 1/1976 | Hayes | 126/271 |
| 3,986,489 | 10/1976 | Schlesinger | 126/270 |
| 3,988,207 | 12/1976 | Watt | 126/271 |

*Primary Examiner*—William F. O'Dea
*Assistant Examiner*—Larry Jones
*Attorney, Agent, or Firm*—Harold W. Adams; Auzville Jackson, Jr.

[57] ABSTRACT

A thermostat or controller for controlling water circulation in a solar heating system is disclosed as including a resistant bridge circuit with a solar panel temperature responsive resistance and a storage tank temperature responsive resistance in opposite arms joined at one power input node with a differential comparator connected across the sensing nodes of the bridge. There are also disclosed optional features including additional fixed resistance divider circuits together with respective additional comparators sensing low-limit solar panel temperatures and/or high-limit storage tank temperatures for turning on or off the circulation pump, and/or for running cool water into the storage tank. In still another disclosed feature a sun switch produces periodic operation of the circulation pump to cause a sensor in the outlet of the solar panel to produce a true reading of solar panel temperature.

9 Claims, 17 Drawing Figures

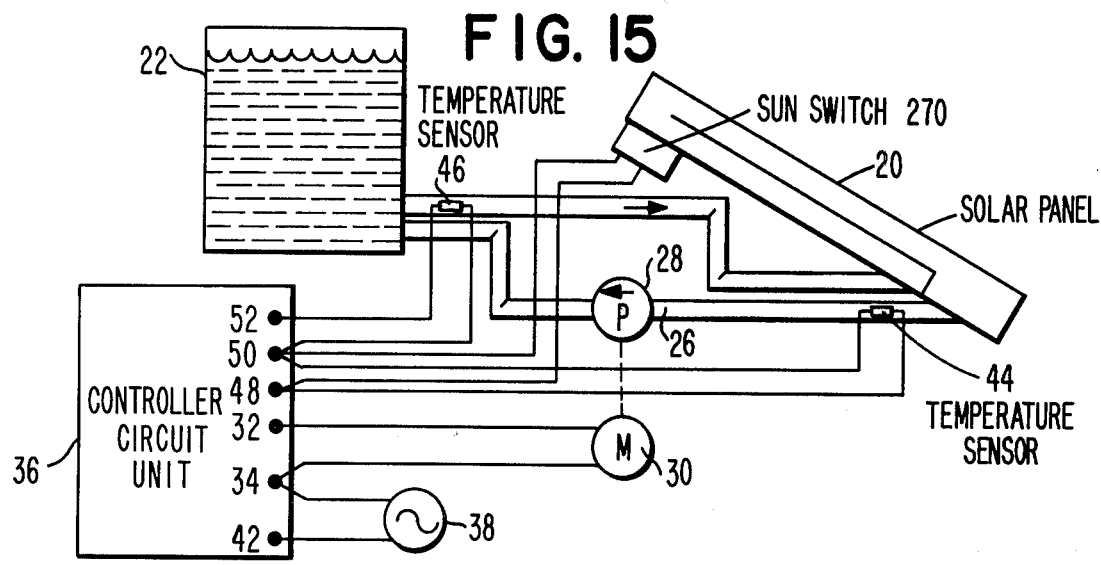
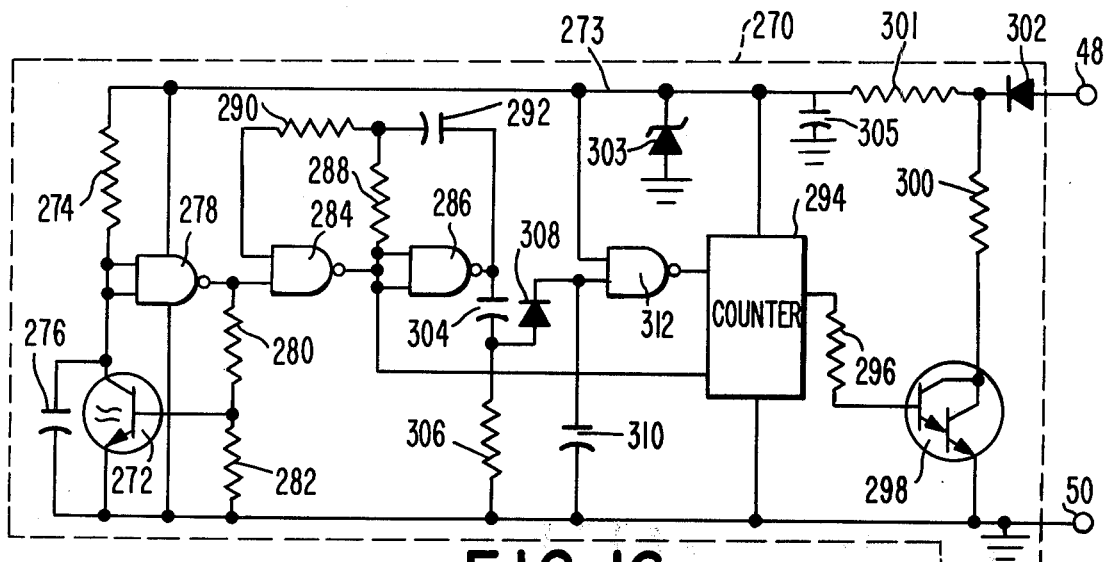
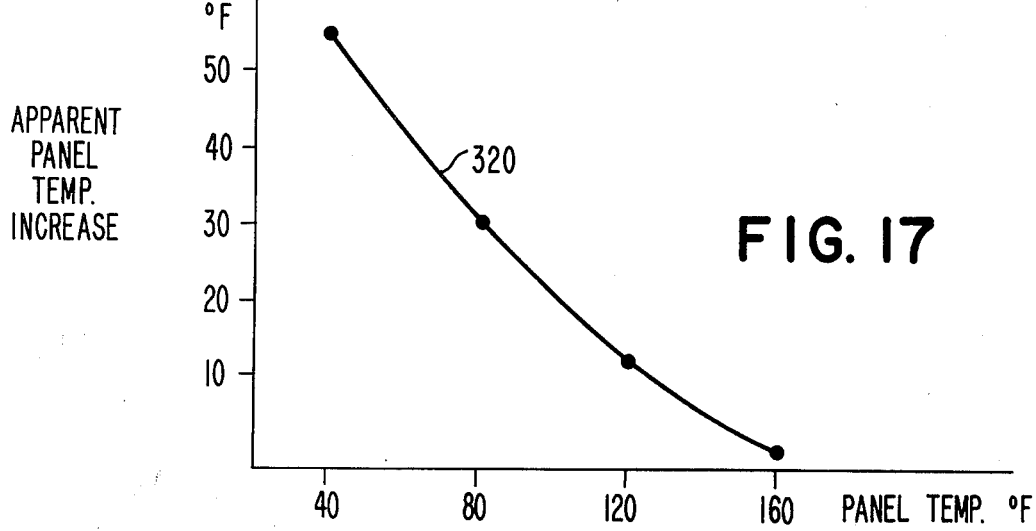

UNIVERSAL DIFFERENTIAL THERMOSTAT FOR SOLAR HEATING SYSTEM

CROSS REFERENCE TO RELATED APPLICATIONS

This application is a continuation-in-part of my copending application Ser. No. 679,286 filed Apr. 22, 1976 which is incorporated herein by reference.

BACKGROUND OF THE INVENTION

1. Field of the Invention

This invention relates to thermostats or controllers for heating systems such as solar heating systems wherein a fluid circulation pump is operated in response to the sensing of a differential temperature between a solar collector and a storage tank.

2. Description of the Prior Art

The prior art is generally cognizant of solar heating systems some of which are controlled in responsive to differential temperatures. U.S. Pat. No. 2,396,338 discloses a radiation heating and cooling system which includes a differential temperature responsive thermostat, constructed using fluid charged bulbs and bellows, to sense a temperature differential between a solar radiation portion and a tank to operate a valve controlling liquid circulation between the tank and solar radiation portion. U.S. Pat. No. 3,598,104 discloses a solar heating system for swimming pools using a surface temperature sensor and a subsurface temperature sensor connected in a bridge circuit with a comparator for operating a water circulation pump. U.S. Pats. No. 3,295,353 and 3,768,059 show other differential temperature responsive devices while U.S. Pats. Nos. 3,275,644 and 3,857,285 show electronic temperature responsive devices.

SUMMARY OF THE INVENTION

The invention is summarized in a controller for a solar heating system which includes a solar collector, a storage tank and pump means for circulating fluid between the solar collector and the storage tank; the controller including a first temperature responsive resistance for sensing a temperature in the collector, a second temperature responsive resistance for sensing a temperature in the storage tank, the first and second temperature responsive resistances being connected together at first ends thereof, a first fixed resistance connected to the other end of the first temperature responsive resistance in a first series circuit therewith, a second fixed resistance connected to the other end of the second temperature responsive resistance in a second series circuit therewith, the first and second series circuits adapted to be connected across a voltage source, switching means for connecting the pump means across a power source, and comparator means having inputs connected between the junction of the first resistances and the junction of the second resistances and having an output connected to the switching means for operating the switching means whenever the first temperature responsive resistance senses a temperature which is different from the temperature sensed by the second temperature responsive resistance by a predetermined differential.

An object of the invention is to construct a controller for a solar heating system responsive to a temperature differential between a solar collector and a storage tank and which is reliable, uses a minimum number of components, and can be readily modified to provide additional functions.

Another object of the invention is to provide a controller that has relatively less cost per control function.

It is also an object of the invention to provide a differential controller that does not require separate sensors for sensing excessive heat or freezing temperatures.

One advantage of the invention is that the interaction between a temperature differential portion of the controller and a high temperature cut-out, where employed, is eliminated.

Additional features of the invention include the provision of one or more fixed voltage dividing circuits providing reference voltages which can be compared to the voltages across the respective solar collector temperature responsive resistance and tank temperature responsive resistance to provide high temperature and/or freezing temperature protection.

Another feature of the invention is the employment of a fixed resistance in one arm with a solar collector sensor in a bridge to provide for a temperature responsive voltage to control low level turn-on or turn-off without the necessity of extra sensors.

A further feature of the invention is the use of an overheat limit circuit to run cold water into an overheated tank and thus prevent excessive temperature in the solar collector.

There is a still further feature in the employment of a sun responsive device to produce a period of circulation of fluid from a solar collector through an outlet where a sensor is located to cause the sensor to read a true solar collector temperature.

Other objects, advantages and features of the invention will be apparent from the following description of the preferred embodiments taken in conjunction with the accompanying drawings.

BRIEF DESCRIPTION OF THE DRAWINGS

FIG. 15 is a diagram of still another variation of the solar heating system of FIG. 1 with sun sensing operation.

FIG. 16 is a diagram of an electrical circuit portion of the variation in FIG. 15.

FIG. 17 is a graph of apparent sensor temperature increase in the variation of FIG. 15.

DESCRIPTION OF THE PREFERRED EMBODIMENTS

Figure 1:
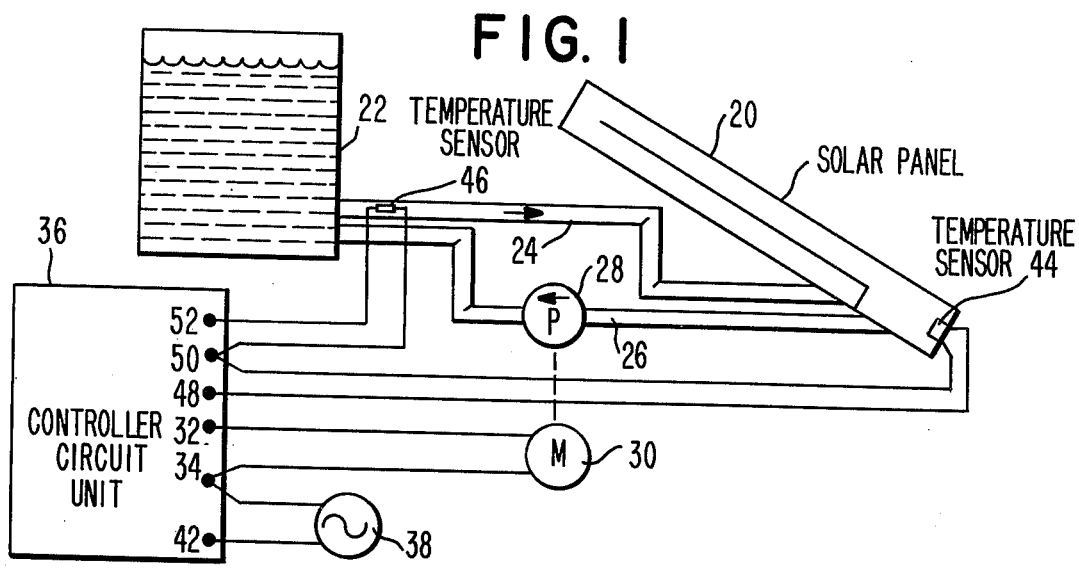
FIG. 1 is a diagram of a solar heating system in accordance with the invention.

As illustrated in FIG. 1, the present invention is embodied in a solar heating system including a solar panel or collector 20 for heating a fluid, such as water, from radiant solar energy and a tank 22 for storing the heated fluid. The tank 22 can be, for example, connected in a conventional manner with a pressuized water supply to provide a hot water supply or can be connected to heat the interior of a building such as through radiators. A pipe 24 connects an outlet of the tank 22 to an inlet of the solar panel 20 while a pipe 26 connects an outlet of the solar panel 20 to an inlet of the tank 22. A pump 28 is suitably provided, for example in the return pipe 26, for circulating the fluid from the tank 22 through the solar panel 20. Connected to the pump 28 is an electric motor 30 which has power input leads connected to power output terminals 32 and 34 of controller circuit unit 36 energized by a suitable power source, such as a 120 volt 60 cycle AC source 38, connected across a power input terminal 42 and the common power terminal 34 of the unit 36. Temperature sensors, such as negative temperature coefficient resistances or thermistors 44 and 46, are suitably mounted for sensing a temperature of the fluid in the solar panel 20 and the tank 22, respectively; for example the temperature sensor 44 is illustrated as mounted in the solar panel 20 adjacent to the outlet thereof while the sensor 46 is mounted in the outlet of the tank 22. The temperature sensor 44 is connected between a terminal 48 and a common terminal 50 of the unit 36 while the temperature sensor 46 is connected between a terminal 52 and the common terminal 50 of the unit 36.

Figure 2:
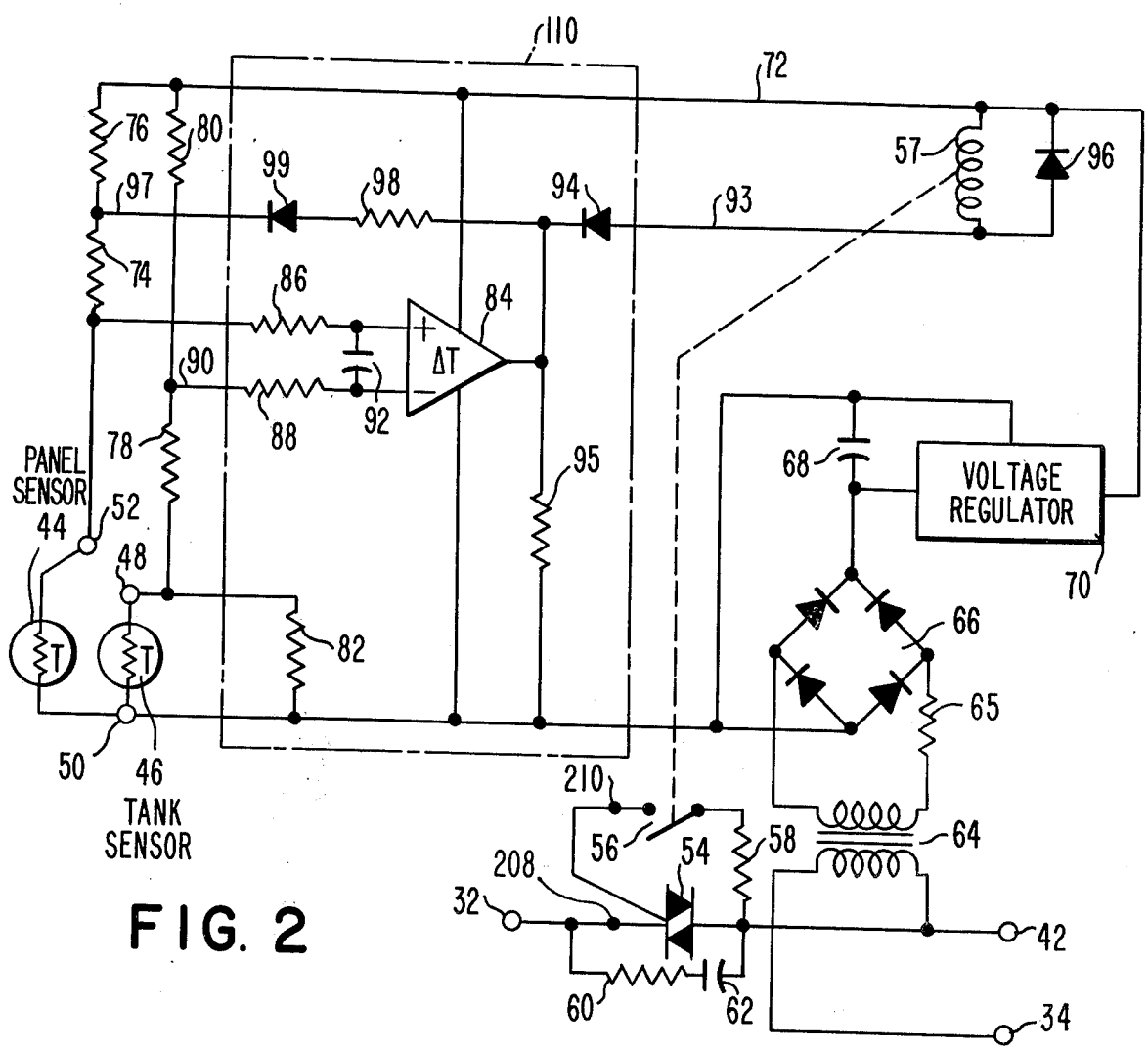
FIG. 2 is a diagram of an electrical circuit portion of the heating system of FIG. 1.

The electrical circuitry within the unit 36, as shown in FIG. 2, includes a power control triac 54 connected between the terminals 32 and 42. Normally open contacts 56 of a relay, such as a reed relay which includes a winding 57 for closing the contacts when energized, are connected in series with a protective resistance 58 from the terminal 42 to a control electrode of the triac 54. Connected across the triac 54 is a series circuit of a resistance 60 and a capacitance 62 which have values selected to limit voltage rise time across the triac 54 to prevent false triggering from transients and the like. A voltage step down transformer 64 has a primary winding connected across the terminals 34 and 42 and has a secondary winding connected in series with a current limiting resistance 65 across the AC inputs of a full wave rectifier 66 which has its negative going DC output joined with the common terminal or node 50 and its positive going DC output connected to one side of a filter capacitance 68. The other side of the capacitance 68 is connected to the terminal 50. Coupled across the capacitance 68 are inputs of a voltage regulator 70 which has on output thereof forming a regulated positive voltage node or junction 72. The panel sensor 44 with the terminals 50 and 52 is connected in series with resistances 74 and 76 in a first circuit across the DC voltage nodes 50 and 72 while the tank sensor 46 with terminals 48 and 50 is connected in series with resistances 78 and 80 in a second series circuit across nodes 50 and 72. A resistance 82 is connected in parallel with the tank sensor 46. The first and second series circuits form a resistance bridge wherein the panel sensor resistance 44 is a first arm of the bridge, the resistances 74 and 76 form a second arm of the bridge, the resistance 80 forms a third arm of the bridge, and the tank sensor resistance 46 with series resistance 78 and parallel resistance 82 form the fourth arm of the bridge. An operational amplifier or comparator 84 has its non-inverting input connected by a resistance 86 to the sensing node or terminal 52 of the bridge between the panel sensor 44 and the resistance 74, and has its inverting input connected by resistance 88 to the other sensing node 90 of the bridge at the junction between resistances 78 and 80. The resistances 86 and 88 and a capacitance 92 connected between the inputs of the amplifier 84 have values selected to prevent operation of the amplifier 84 by spurious signals, induced electrical noise and the like. The relay winding 57 has one end connected to the voltage node 72 and its other end 93 connected to the anode of a diode 94 which has its cathode connected to the output of the amplifier 84 together with one end of a bias resistance 95 which has its other end joined to the common terminal 50. A protective diode 96 is connected across the winding 57. Connected between the output of the amplifier 84 and the junction 97 between the resistances 74 and 76 is a series circuit of a resistance 98 and a diode 99 which has a polarity to conduct positive voltage from the output of the amplifier 84 to the junction 97. The power inputs of the amplifier 84 are connected across the DC voltage nodes 50 and 72.

The panel sensor 44 and the tank sensor 46 preferrably have substantially the same temperature responsive characteristics. The values of the resistances 76 and 80, taking into consideration the values of resistances 74, 78 and 82, are selected to produce a zero or negative voltage on the output of amplifier 84 when the temperatures sensed by the sensors 44 and 46 reach a predetermined differential (the sensor 44 sensing a temperature which is the predetermined amount greater than the temperature sensed by the sensor 46) at an average normal tank temperature. The resistances 78 and 82 have values selected to linearize the differential response, i.e. to produce zero voltage across nodes 52 and 90 for substantially the same temperature differential, throughout a normal range of tank temperatures; for the thermistors 44 and 46, the resistance 78 is selected to linearize the differential at higher tank temperatures while the resistance 82 is selected to linearize the differential at lower tank temperatures. A hysteresis or difference between turn-off (the output of amplifier 84 changing from negative to positive) and turn-on (the output of amplifier 84 changing from positive to negative) is set by the value of the resistance 98 taking into consideration resistance 74. The resistance 74 is inserted for use with a low limit temperature comparator in a modification shown in FIG. 4 as will be explained hereafter, but is merely additive to the resistances 76 and 98 in the circuit of FIG. 2.

In operation of the solar heating system of FIG. 1, the sensing of a temperature in the solar panel 20 by the sensor 44 greater by more that the predetermined differential from the temperature of the tank 22 sensed by the temperature sensor 46 results in operation of the controller circuit unit 36 to energize the motor 30 and operate the pump 28 circulating fluid from the tank 22 through the solar panel 20 where the fluid is heated by solar energy impinging upon the panel 20. When the temperature sensed by the sensor 44 is less than the predetermined differential above the temperature sensed by the sensor 46, the motor 30 remains unenergized by the controller circuit unit 36 to prevent circulation of the fluid in the tank 22 through the solar panel 20; thus the heat of the fluid in the tank 22 is conserved and circulation is prevented where there is insufficient temperature differential between the solar panel 20 and the tank to provide significant heating of the water in the tank 22.

Referring to FIG. 2, the resistance of the panel thermistor sensor 44 becomes substantially less than the resistance of the tank thermistor sensor 46 when the temperature of the solar panel exceeds the temperature of the tank by more the predetermined differential so that the voltage at terminal 52 becomes negative relative to the voltage at terminal 90 rendering the output of the operational amplifier 84 negative. Current from the voltage terminal 72 through the relay winding 57 and the output of the amplifier 84 then operates the reed relay to close contacts 56 and render the triac 54 conductive energizing the motor output terminal 42. When the temperature of the solar panel is less than the predetermined differential greater than the temperature of the tank, the node 52 is positive relative to node 90 due to the resistance of sensor 44 not being sufficiently less than the resistance of sensor 46; thus the operational amplifier 84 has a high or positive output which blocks current passage through diode 94 and the relay winding 57 to allow the contacts 56 to open and maintain the triac 54 in a non-conductive state to deenergize the motor output 42. The high output of the amplifier 84 renders the diode 99 conductive and current through the resistance 98 slightly raises the voltage at terminal 52 relative to the voltage of the terminal 90 to provide a hysteresis in the operation of the differential amplifier 84 and to prevent hunting or vacillation of the circuit unit between on and off conditions.

In a specific example, the transformer 64 was a 120 volt to 24 volt stepdown transformer, the temperature sensing resistances 44 and 48 were Fenwal thermistors No, UUT43J1, the voltage regulator 70 was type 78L18A, and the amplifier 84 was type 741. The resistances and capacitances were selected to have the values as indicated in the following table:

| Resistance 58, 60 and 65 | 82 ohms |
|---|---|
| Capacitance 62 | 0.1 Mfd. |
| Capacitance 68 | 100 Mfd. |
| Resistance 74 | 2000 ohms |
| Resistance 78 | 150 ohm |
| Resistance 80 | 17.8k ohm |
| Resistance 82 | 680k ohm |
| Resistances 86 and 88 | 82K ohm |
| Capacitance 92 | 0.047 Mfd. |
| Resistance 95 | 27k ohm |

Figure 3:
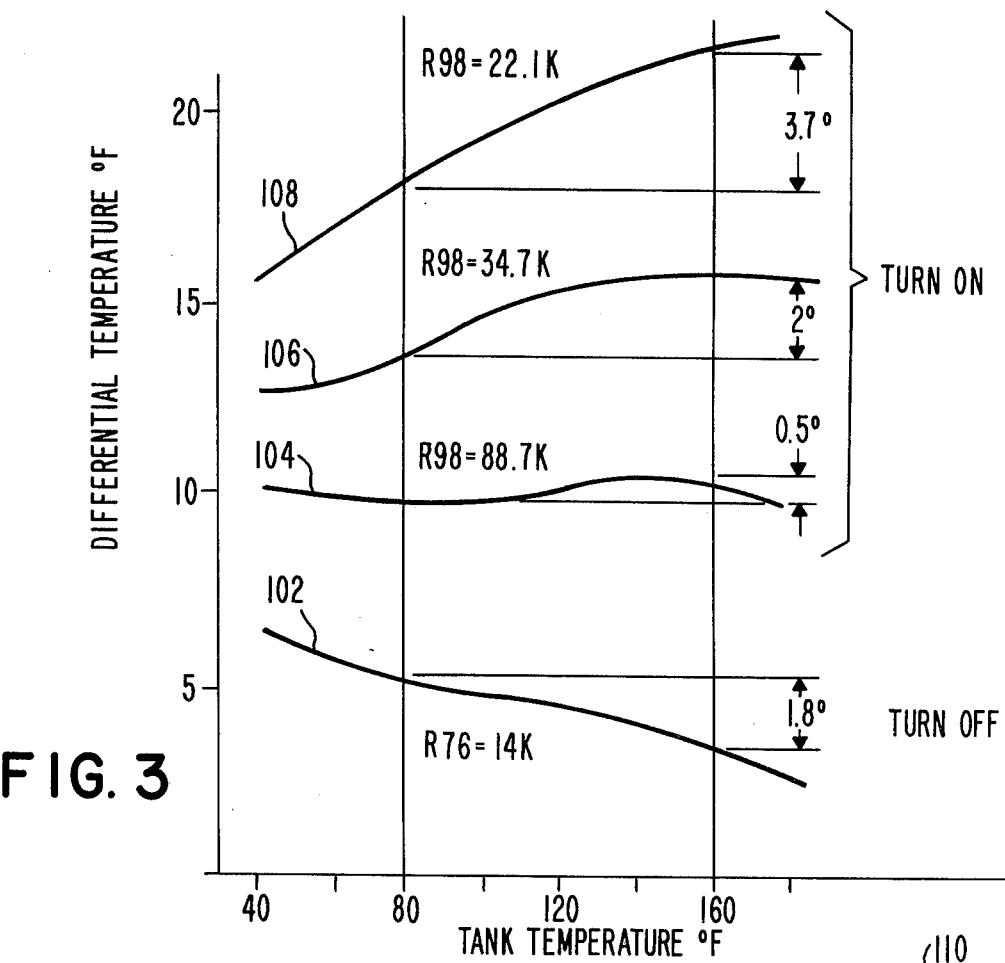
FIG. 3 is a graph of differential temperature response for varying settings of differential response of the circuit of FIG. 2.

With the resistor 76 selected at about 14k ohms, the amplifier 84 turned off (i.e. the output went from negative the positive) when the temperature sensed by the sensor 44 dropped below about 2.8° C. greater than the temperature sensed by the sensor 46 as illustrated by the curve 102 in FIG. 3 for varying temperatures sensor 44. Curves 104, 106 and 108 illustrate the turn-on differential temperatures of the controller unit (i.e. the output of amplifier 84 going from positive to negative) when the resistance 98 is selected to be 88.7k ohms, 34.7k ohms and 22.1k ohms, respectively, for varying tank temperatures. Smaller values may be selected for the resistance 76 to produce a greater differential temperature at turn-off; such greater turn-off differential temperature correspondingly raising the turn-on differential temperatures represented by curves 104, 106 and 108 since the difference between turn-on and turn-off remains generally constant for a selected value of resistance 98.

Figure 4:
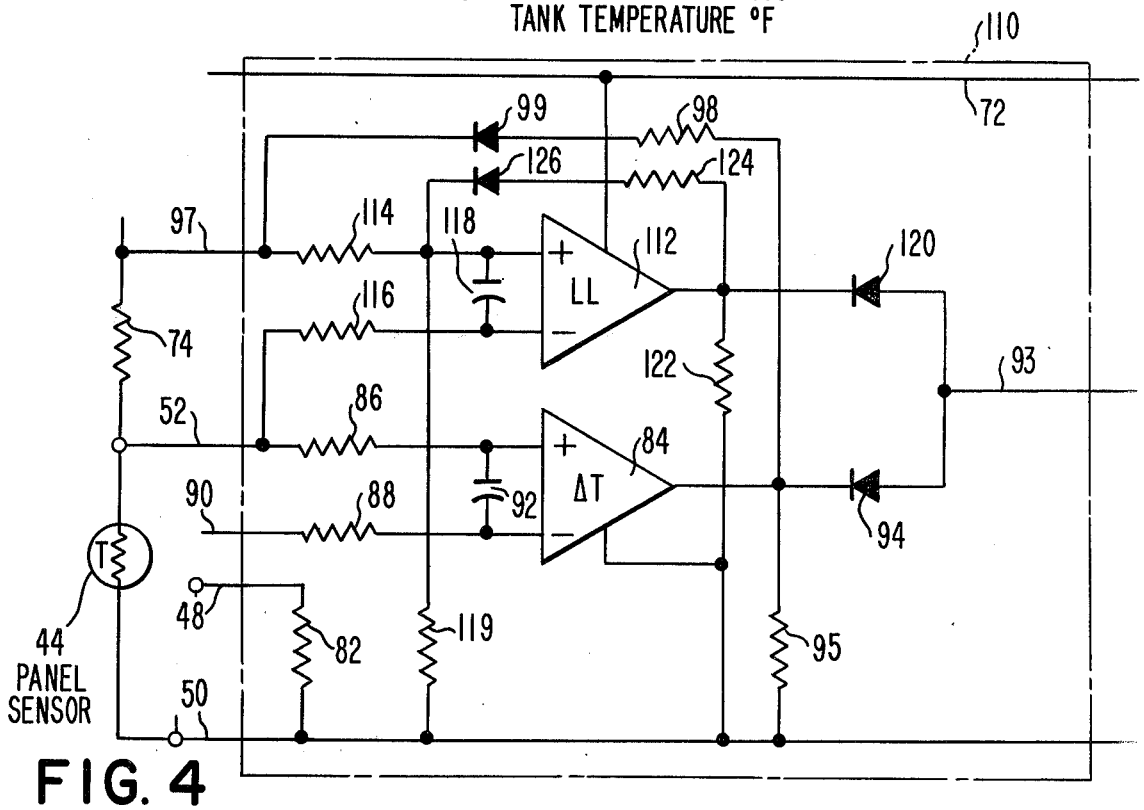
FIG. 4 is a diagram of a modified electrical circuit portion which can replace a portion of the circuit of FIG. 2 to provide a low limit protection.

The circuitry enclosed within the long and short dashed line 110 of FIG. 2 is modified by adding a low level comparator in the modification of FIG. 4. The additions include an operational amplifier 112 having its non-inverting input connected by a resistance 114 to the junction 97 between resistances 74 and 76 and having its inverting input connected by a resistance 116 to the junction 52. Conveniently the amplifiers 84 and 112 can be a dual amplifier integrated circuit such as type 1558 with common power terminals connected to the D.C. voltage terminals 72 and 50. A capacitance 118 is coupled between the inputs of the amplifier 112. The values of the resistances 114 and 116 and the capacitance 118 are selected to avoid erroneous operation of the amplifier 112 from spurious signals generated by electrical noise, etc. The output of the amplifier 112 is connected to the line 93 by a diode 120 and to one end of a bias resistance 112 which has its other end connected to the common junction 50. The diode 120 has a polarity passing only positive current from line 93. A series circuit of a resistance 124 and a diode 126 are connected between the output of the amplifier 112 and the non-inverting input; the diode 126 having a polarity to pass positive current to the non-inverting input while the resistance 124 has a value selected to produce a predetermined difference between turn-on and turn-off conditions of the amplifier 112. A resistance 119 has one end connected to the non-inverting input of the amplifier 112 and has its other end connected to the common terminal 50. It is noted that a bridge circuit is formed by the temperature responsive resistance 44 and the resistances 74, 114 and 119 when the diode 126 is non-conductive; resistance 44 forming one arm of the bridge, the resistance 74 forming a second arm of the bridge, the resistance 114 forming a third arm to the bridge and the resistance 119 forming a fourth arm of the bridge. The resistance 119 has a value selected to turn-off the low level comparator circuit (i.e. change the output of the amplifier 112 from negative to positive) at a temperature sensed by the panel sensor 44 a comfortable margin above freezing temperature. The resistance 124 has a value selected to turn-on the low level comparator (i.e. to render the output of the amplifier 112 negative) when the temperature sensed by the panel sensor 44 is near freezing temperature such as one or two degrees above freezing temperature.

In operation to the modified circuit in FIG. 4 when the temperature sensed by the panel sensor 44 approaches freezing temperature, the resistance of the sensor 44 increases causing the voltage on terminal 52 to go positive relative to the voltage on the junction between resistance 119 and diode 126; thus the output of the operational amplifier 112 becomes negative completing a path from line 93 through diode 120 and the output of the amplifier 112 to the common terminal 50 to cause the relay winding 57, FIG. 1, to be energized to operate the pump and circulate water through the solar panel to prevent freezing of the water in the solar panel. Also when the output of the amplifier 112 goes low, current through the resistance 124 and diode 126 is stoppd, thus rendering the voltage on the non-inverting input of the amplifier 112 even lower than the voltage on the inverting input to make it necessary for the temperature sensed by the sensor 44 to rise to a temperature substantially greater than the turn-on temperature before the pump will be turned-off. When the temperature sensed by the sensor 44 rises to this higher temperature, the output of the amplifier 112 is rendered positive terminating current flow through the diode 120 to thus deenergize the relay and the pump motor. Current flow through the resistance 124 raises the voltage on the non-inverting input of amplifier 112 so that the panel temperature must drop to the lower temperature near freezing in order to turn-on the pump.

In a specific example of the modification of FIG. 4, the components identified by the same number have the same value as in the example for FIG. 2 while the amplifiers 84 and 112 are respective amplifiers on a type 1558 integrated circuit. The capacitance 118 and resistances 114, 116 and 122 have values equal to the capacitance 92 and resistances 86, 88 and 95, respectively. Values of resistance 119 range from 3.3M to 3.9M ohm to produce turn-off panel temperatures from 5° C. to 2.8° C. Values of resistance 124 from 1.8M to 3.0M ohm result in a turn-on temperature about 3.3° C. to 2.2° C. below turn-off.

Figure 5:
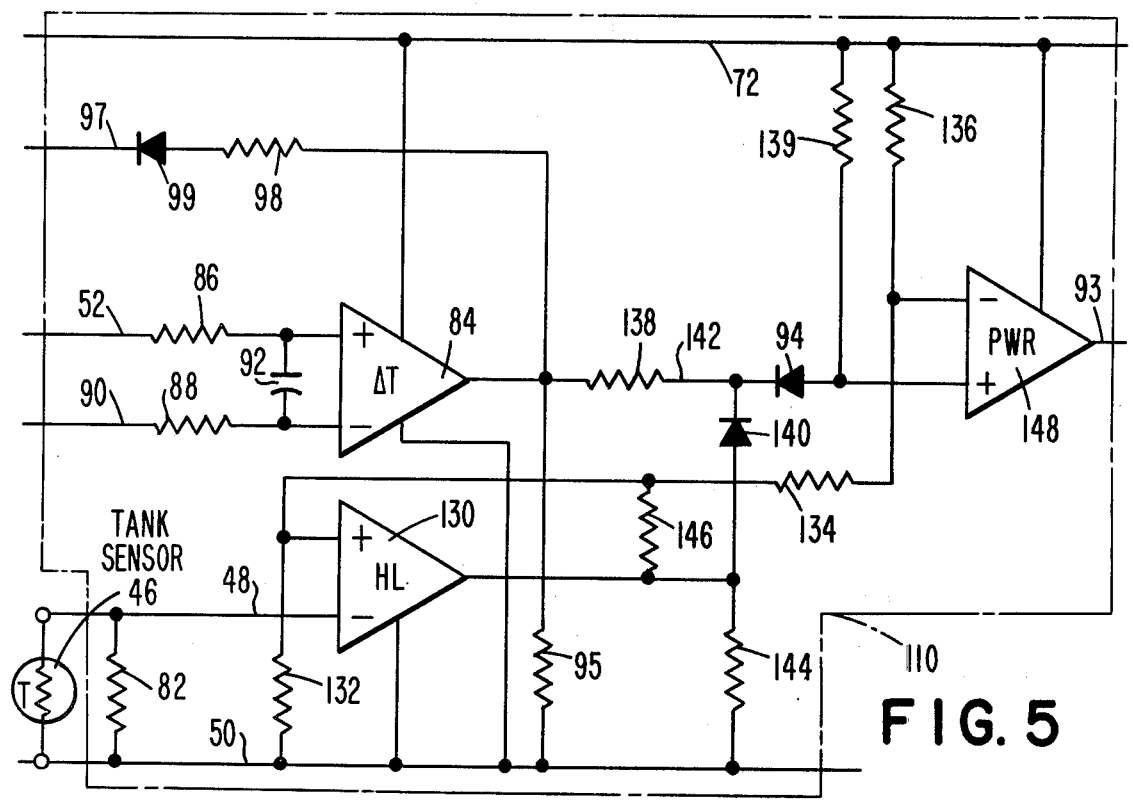
FIG. 5 is a diagram of another modified circuit portion which can be substituted in FIG. 2 to provide high limit protection.

A high limit cut-off for preventing operation of the circulation pump when the water temperature in the tank becomes excessively high can be provided by additions to the circuitry within the dashed line 110 of FIG. 2 as shown in the modification of FIG. 5. The additions include an operational amplifier or comparator 130 which has its inverting input connected to the junction 48 and its non-inverting input connected to a junction between resistances 132 and 134, the resistance 132 being connected to the common terminal 50 while the resistance 134 is connected in series with a resistance 136 to the positive voltage terminal 72. A resistance 138 has been inserted between the output of the amplifier 84 and the diode 94 with a bias resistance 139 connected between the anode of the diode 94 and the positive voltage node 72. The output of the amplifier 130 is connected to the anode of a diode 140 which has its cathode connected to the junction 142 between the resistance 138 and the diode 94 to form a gate circuit. A bias resistance 144 is connected between the junction 50 and the output of the amplifier 140. Connected between the output of the amplifier 130 and the non-inverting input of the amplifier 130 is a resistance 146 which has a value selected to produce a desired difference between the turn-on and turn-off temperatures of the amplifier 130. Also the anode of the diode 94 is connected to the non-inverting input of an operational amplifier 148 which has its inverting input connected to the junction between resistances 134 and 136 and has its output connected to lead 93. The relative values of the resistances 134 and 136 are selected to hold the inverting input of the amplifier 148 negative relative to the non-inverting input of amplifier 148 when either of the amplifiers 84 and 130 produce a positive output, and to allow the non-inverting input of amplifier 148 to become negative relative to the inverting input of amplifier 148 only when the outputs of both amplifiers are negative.

In operation of the modification of FIG. 5 when the temperature in the tank 22, FIG. 1, reaches a high limit, the resistance of the tank sensor 46 drops to a level which renders the terminal 48 negative relative to the junction between the resistances 132 and 134. The output of the amplifier 130 is driven positive which drives junciton 142 positive through diode 140. Due to the resistance 138 the junction 142 is maintained positive by the positive current flow through diode 140 even if the output of the amplifier 84 becomes negative due to the solar panel reaching a temperature greater than the tank temperature by more than the predetermined differential. Also when the output of the amplifier 130 goes positive, current through the resistance 146 drives the non-inverting input of the amplifier 130 still more positive relative to the inverting input thereof; thus the temperature to which the tank must drop to render the output of amplifier 130 negative is substantially below the temperature which caused the amplifier to produce a positive output. After such a drop in temperature, the resistance of the sensor 46 increases sufficiently to raise the voltage on terminal 48 and to render the inverting input of the amplifier 130 positive with respect to the non-inverting input thereof causing the output of the amplifier 130 to go negative and render the diode 140 non-conductive; thus the amplifier 84 is permitted to control the amplifier 148 in response to the temperature differential between the tank and panel. The amplifier 148 controls lead 93, the relay and pump motor in the same manner as previously described in connection with the output of amplifier 84 in the circuit of FIG. 2. The use of the high limit comparator prevents the water in the tank from exceeding a set high limit.

In a specific example of the circuit of FIG. 5, values of components with the same number are the same as in the previous examples while amplifier 84 is a type #741 integrated circuit and amplifiers 130 and 148 are formed by a type #1558 integrated circuit. Resistance 144 is the same value as resistance 95. Resistances 134, 136, 138 and 139 have the values 56.2k ohm, 10k ohm, 22k ohm and 4.7k ohm, respectively. Values of resistance 132 between 7.6k and 16.9k result in a high limit turn-off in the range from 93.3° C. to 71° C. while values of resistance 146 between 1.5M ohm to 324k ohm produce turn-on temperatures from 1.1° C. to 5.6° C. below turn-off.

Figure 6:
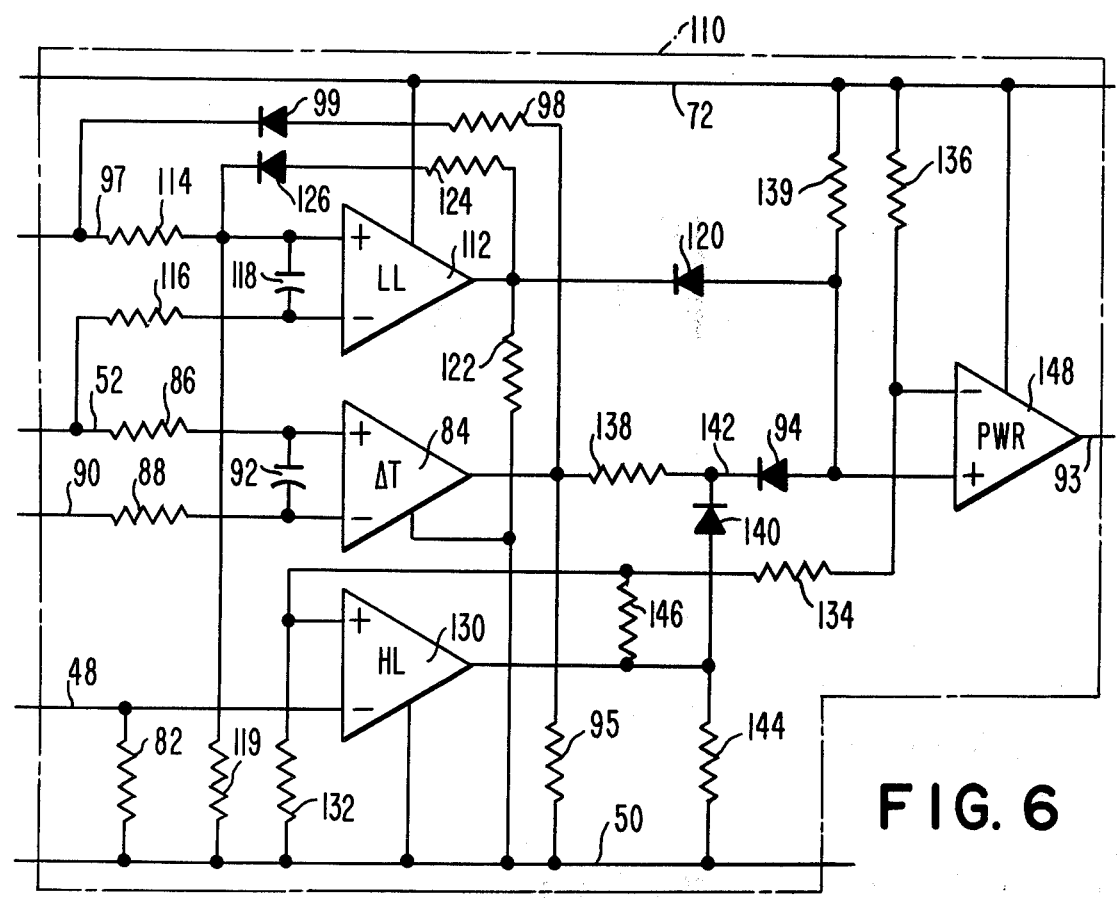
FIG. 6 is a diagram of still another circuit suitable for substitution in the circuit of FIG. 2 to provide both high limit and low limit protection.

The low limit turn-on circuitry of FIG. 4, can be added to the modification of FIG. 5 to produce a combined circuit as shown in FIG. 6 having both a low limit turn-on and high limit turn-off of the water circulation pump. The anode of the diode 120 is connected between the junction of the resistance 139 and the diode 94; otherwise the low limit amplifier 112 and the associated resistances, capacitance and diode are connected in the circuit in the same manner as herein before described in connection with FIG. 4. Turn-on, i.e. the output of amplifier 148 being rendered low, occurs when either of the outputs of the amplifiers 84 or 112 become low in response to a differential temperature between the solar panel and the tank exceeding the predetermined differential temperature or the panel temperature dropping near freezing temperature; the high limit amplifier 130 goes high when the tank temperature reaches the high limit temperature to prevent turn-on of the circulation pump from the operation of the differential comparator 84.

Figure 7:
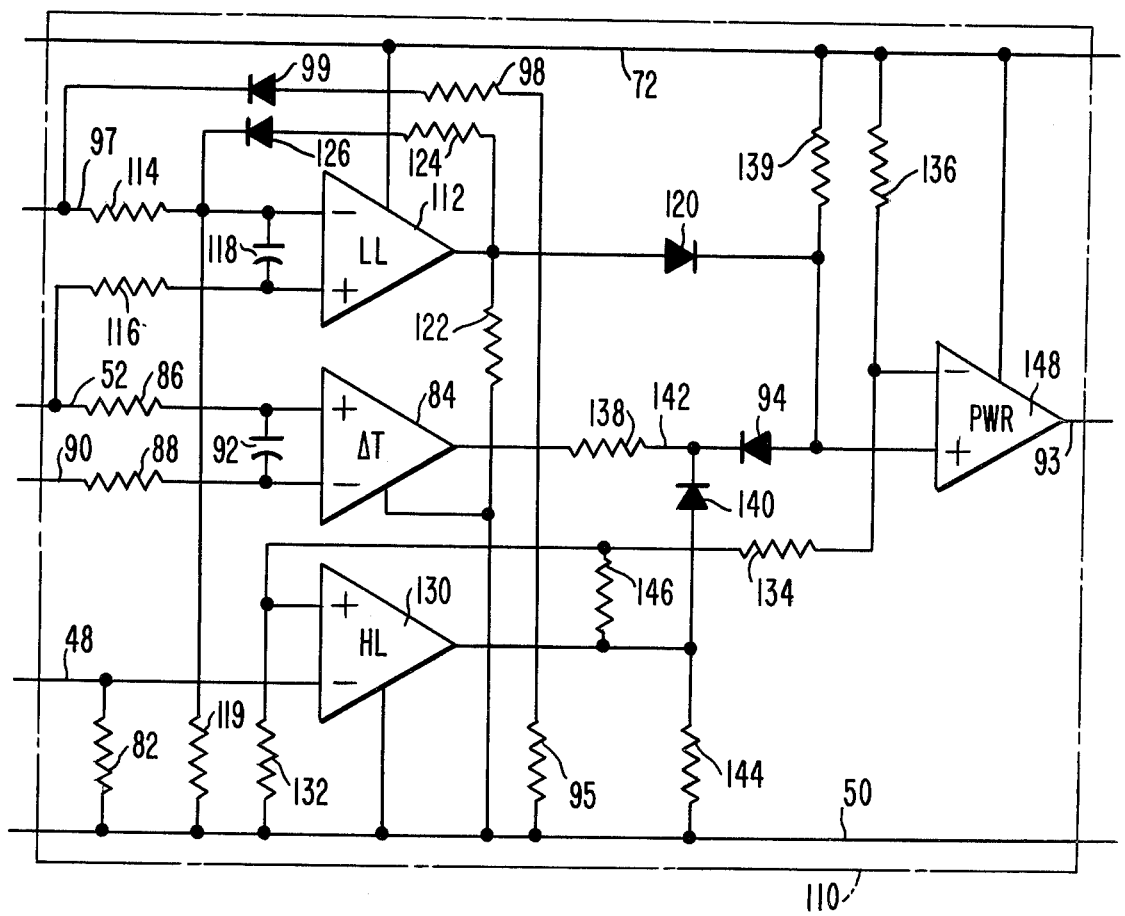
FIG. 7 is a diagram of a variation of the modification in FIG. 6 providing a different low limit protection.

In a further modification illustrated in FIG. 7, the low limit circuitry is converted from a low limit turn-on to a low limit turn-off by reversing the inputs to the operational amplifier 112 and by reversing the polarity of the diode 120. Also the values of the resistances 119 and 124 are changed to raise the temperature at which the output of the operational amplifier 112 is operated to a temperature below which the temperature of the solar panel is inadequate to heat the water. When the temperature of the solar panel drops below this inadequate temperature the output of the operational amplifier 112 becomes positive applying current through diode 120 to maintain the noninverting input of the amplifier 148 positive preventing operation of the water circulation pump. This conserves energy by not operating the water circulation pump when the temperature of the solar panel is not adequate to heat the water. As an example of the changes, values of resistance 119 between 732k ohm and 1.18M ohm produce turn-off temperature responses from 37.8° C. to 26.7° C., and values of resistance 124 from 7.87M ohm to 3.32M ohm result in turn-on between 1.7° C. and 4.4° C. below turn-off.

The employment of the particular bridge circuit for sensing temperature differential, i.e. the panel sensor 44 and tank sensor 46 in respective bridge arms joined at one D.C. voltage node, permits a wide range of modifications with a minimum number of cirucit changes and additions. It is noted that the low level protection circuits of FIGS. 4, 6 and 7 and the high level protection circuits of FIGS. 5, 6 and 7 are added without the necessity of adding additional temperature sensors. The use of the two resistances 74 and 76 in one arm of a bridge used for differential sensing at relatively high levels allows the connection of one resistance 74 in a second bridge circuit for low level sensing; thus the single panel sensor 44 can be used in two different ranges, namely the high temperature range sensed by the differential comparator 84 where the resistance of sensor 44 is relatively low and the low temperature range sensed by the low limit comparator 112 where the resistance of sensor 44 is relatively high. Further this particular bridge cirucit permits the series circuit of the resistances 80 and 78 and tank sensor 46 with parallel resistance 82 to be used with the further voltage dividing circuit of resistances 132, 134 and 136 to operate the high limit comparator 130 in still another range, the high temperature range of the tank sensor 46. It is also noted that in the circuit the low limit comparator 112 is responsive only to the panel sensor 44 and the high limit comparator 130 is responsive only to the tank sensor 46; thus the low limit response is independent of tank sensor 46 and high limit response is independent of panel sensor 44.

Figure 8:
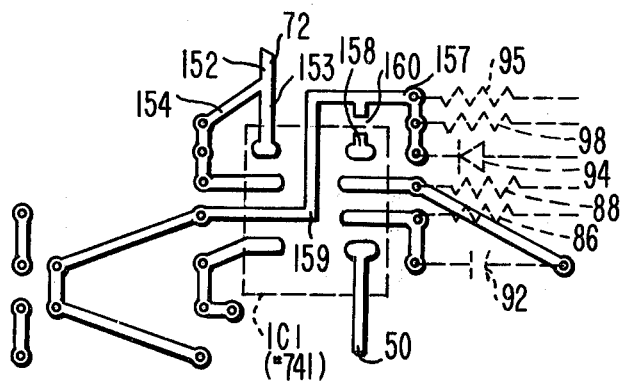
FIG. 8 is a diagram of a portion of a printed circuit pattern used in the circuit of FIG. 2.
Figure 9:
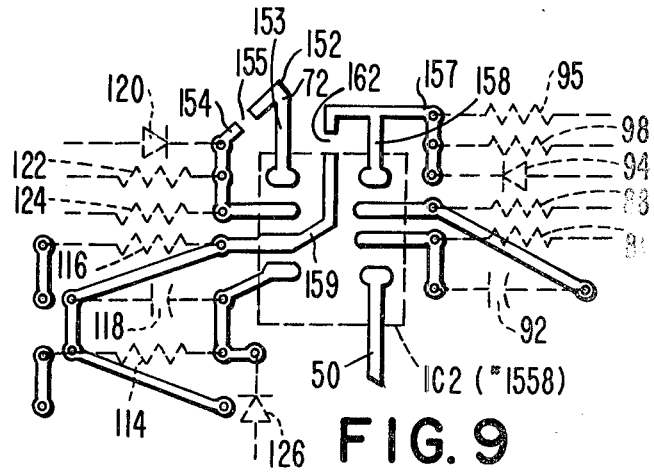
FIG. 9 is a diagram of a modification of the circuit pattern of FIG. 8 used in the circuit of FIG. 3.

The illustrated circuit further is such that it can be manufactured in its several modifications utilizing the same printed circuit board; thus separate printed circuit boards do not have to be made or stocked for the different modifications. This is illustrated in FIGS. 8 and 9 which show the connection of an integrated circuit IC1 (type #741) in a circuit pattern in FIG. 8 to form the amplifier 84 of FIG. 2, and the connection of an integrated circuit IC1 (type #1558) to the same circuit pattern in FIG. 9 to form the amplifiers 84 and 112 of FIG. 4. The circuit pattern has a circuit conductor 152 which branches into branches 153 and 154 used in the pattern shown in FIG. 8; the branch 154 is cut at 155 from the circuit path 152 in the modification of FIG. 9. Similarly a circuit conductor 157 has branches 158 and 159; the branch 158 severed by cut 160 from the conductor 157 in FIG. 8 while the branch 159 is severed by a cut from the conductor 157 in FIG. 9. The employment of a conductor with several branches or interconnections one or more of which are selectively cut to from a desired modification substantially reduces the cost of making, handling and stocking printed circuit patterns for different modifications of the circuit.

Figure 10:
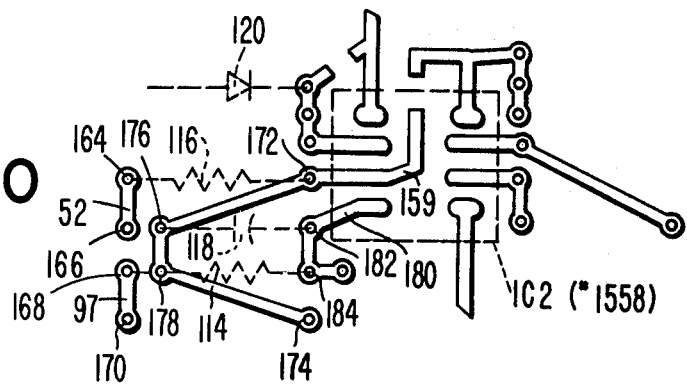
FIG. 10 is a diagram of a second modification of the circuit pattern of FIG. 8 used in the circuit diagram of FIG. 5.
Figure 11:
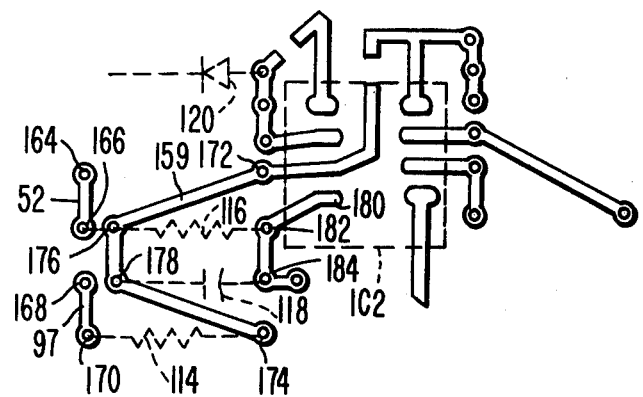
FIG. 11 is a diagram of a third modification of the circuit pattern of FIG. 8 used in the circuit of FIG. 6.

The use of the printed circuit pattern for both the low limit turn-on and the low limit turn-off conditions is illustrated in FIGS. 10 and 11 wherein the terminal or conductor 52 has alternate resistance lead receiving openings 164 and 166, the terminal of conductor 97 has alternate resistive lead receiving openings 168 and 170, the branch 159 has alternate resistance lead receiving openings 172 and 174 and alternate capacitance lead receiving openings 176 and 178, and a conductor 180 has alternate lead receiving openings 182 and 184. As shown in FIG. 10 for the low limit turn-on, the openings 164 and 172 are aligned so that they receive the leads of the resistor 116, the openings 168 and 184 are aligned so that they receive the leads of the resistor 114, and the openings 176 and 182 are aligned so that they receive the leads of the capacitance 118. As shown in FIG. 11 for limit turn-off the openings 166 and 182 are aligned so that they receive the leads of the resistance 116, the openings 170 and 174 are aligned so that they receive the leads of the resistance 114, and the openings 178 and 184 are aligned so that they receive the leads of the capacitance 118. It is noted that the opening 116 is aligned with the openings 176 and 182 on the same side of the opening 182 as opening 176 but spaced further from the opening 182 than the opening 176 and similarly the opening 168 is aligned with the opening 178 but spaced further apart from opening 184.

This use of the same printed circuit pattern for different circuits is made possible by the use of alternate lead receiving openings in a first conductor aligned with respective lead receiving openings in second and third conductors so that an element or elements can be alternately connected between the first conductor and the second and third conductors. Further the use of the openings 166 and 168 spaced further from the respective openings 182 and 184 than the openings 176 and 178 allows the use of longer and shorter components to be inserted in the openings conserving space and making alternate use of the printed circuit pattern feasible.

Figure 12:
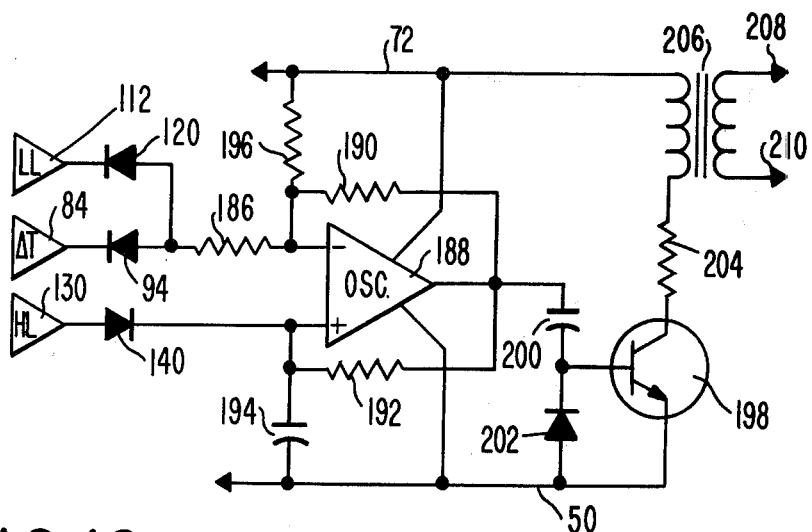
FIG. 12 is a diagram of a modified circuit portion for substitution between comparators and pump switch means in the circuit of FIG. 2.

A controlled oscillator circuit shown in FIG. 12 can be used to energize the triac 54 instead of the relay (winding 57 and contacts 56 of FIG. 2), such relay and the resistance 58 being eliminated in this alternative. The diodes 94 and 120 have their cathodes connected to the respective amplifiers 84 and 112 and their anodes connected to one end of a resistance 186 which has its other end connected to the inverting input of the operational amplifier 188. The cathode of the diode 140 from the amplifier 130 is connected to the non-inverting input of the amplifier 188. Feedback resistors 190 and 192 are connected from the output of the amplifier 188 back to the inverting and non-inverting inputs thereof respectively, while a capacitance 94 is coupled from the non-inverting input of the amplifier 188 to the negative voltage terminal 50. A resistance 196 is coupled between the inverting input of the amplifier 188 and the positive voltage terminal 72. The output of the amplifier 188 is coupled to the base of a transistor amplifier 198 by a coupling capacitance 200. A protective diode 202 is coupled across the base and emitter terminals of the transistor 198 and a protective resistance 204 is coupled in series with the collector terminal of the transistor 198 and the primary winding of a transformer 206 which has its secondary winding coupled at points 208 and 210, FIG. 2, across the control electrode and one output electrode of the triac 54. The resistances 190, 192 and 196 and the capacitance 194 are selected to produce an oscillation of the output of the amplifier 188 at a frequency which is sufficiently high to trigger the triac 54 at the beginning of each cycle of the A.C. power signal.

In operation of the oscillator excitation circuit of FIG. 12, the oscillator 188 is allowed to freely oscillate whenever the outputs of either of the amplifiers 84 and 112 are low providing the output of the amplifier 130 is also low. A positive voltage on the output of the amplifier 130 indicating the tank temperature is at the high limit prevents oscillation of the amplifier 188. In particular when the junction of the anodes of the diodes 94 and 120 is held negative by either one or both of the outputs of the amplifiers 84 and 112 being negative, the inverting input of the amplifier 188 is free to be changed by the feedback voltage through resistance 190; and when the output of the amplifier 130 is low the non-inverting input of the amplifier 188 is free to be changed by feedback through the resistance 192. The output of the amplifier 188 drives the transistor 198 which in turn produces an alternating current through the primary of the transformer 206 energizing the secondary winding to render the triac 54 conductive.

For an example of suitable circuit oscillator components, the amplifier 188 is a type #741, the resistors 186, 190, 192 and 196 have equal values of 10k ohm, the resistor 204 is a 120 ohm resistance, the transistor 198 is a type 2N3642, the capacitors 194 and 200 have values of 0.047 Mfd. and 0.001 Mfd. respectively, and the transformer 206 is a BPMC 4259-0003 transformer.

Figure 13:
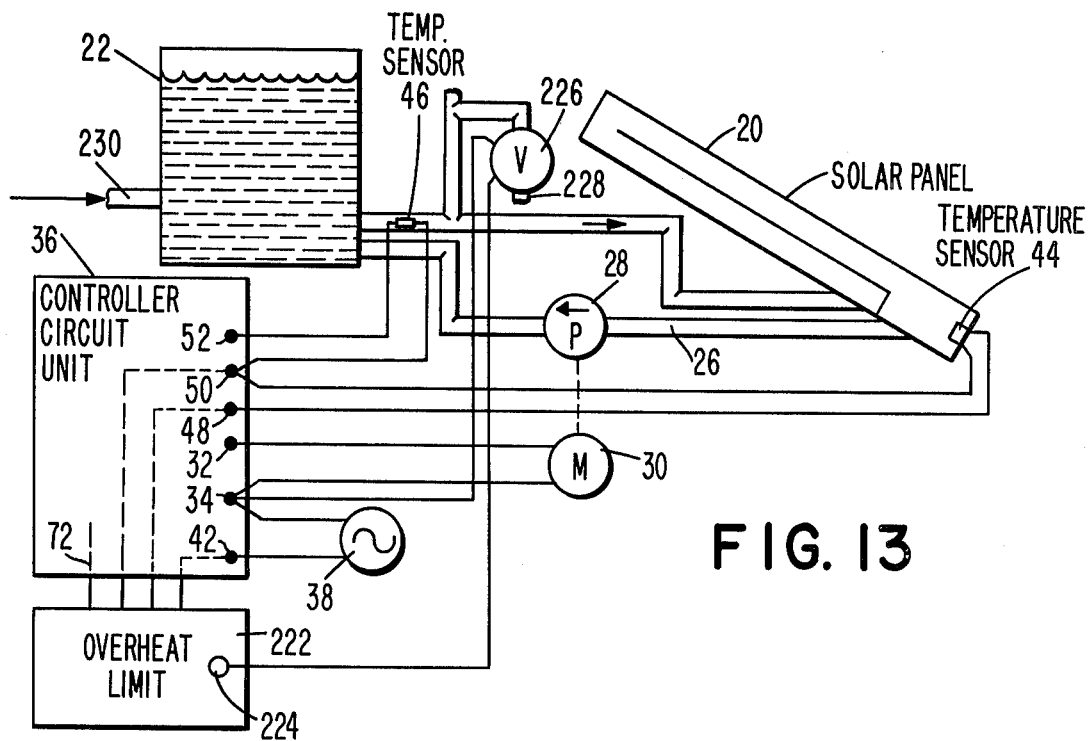
FIG. 13 is a diagram of another variation of the solar heating system of FIG. 1 with overheat protection.

A variation of the solar heating system as illustrated in FIG. 13 includes an overheat limit unit 222 which has four internal connections to junctions 72, 50, 48 and 42 of the controller circuit unit 36. A terminal 224 of the unit 222 is connected to one side of the winding a solenoid valve 226; the other side of the solenoid winding is connected to terminal 34 of unit 36. The solenoid valve is a normally closed valve connected in a discharge outlet 228 for the closed tank 22 which has an inlet connected to a pressurized water supply 230.

Figure 14:
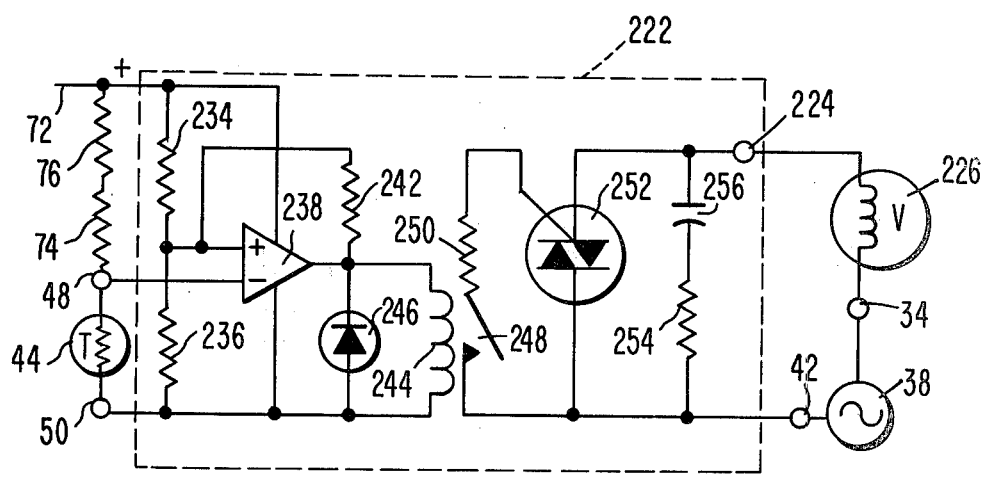
FIG. 14 is a diagram of an electrical circuit portion of the variation in FIG. 13.

The circuitry in the unit 222 shown in FIG. 14 includes resistances 234 and 236 connected in a voltage divider circuit across the D.C. voltage nodes 72 and 50 in parallel with the power inputs of an operational amplifier 238. The amplifier 238 has its non-inverting input connected to the junction between resistances 234 and 236 and has its inverting input connected to junction 48 between the tank temperature sensor 44 and the resistance 74. A positive feedback resistance 242 is connected between the output of the amplifier 238 and its input. Connected between the output of the amplifier 238 and the negative voltage node 50 is a winding 244 of a reed relay with a protective diode 246 connected across the winding 244. Contacts 248 of the relay are connected in series with a resistance 250 between the junction 42 and the control electrode of a triac 252 which has its power electrodes connected between the terminals 42 and 224. A false trigger preventing circuit including a series resistance 254 and capacitance 256 is connected across the triac 254.

In operation of the solar heating system with the overheat limit unit 222 of FIGS. 13 and 14, an overheat limit temperature in the tank 22 causes the unit 222 to open valve 226 and discharge hot water from the tank 22. Cold water from the supply 230 is thus allowed to flow into the tank 22 cooling the tank water to a turn-off temperature which is a predetermined amount below the overheat temperature. More particularly, the increase in temperature to the overheat limit results in the resistance of the sensor 44 dropping to a value where the voltage on junction 48 goes negative relative to the voltage between resistances 234 and 236. This drives the output of amplifier 238 high energizing winging 244 to close contacts 248 and excite triac 252 to complete a circuit with the A.C. source 38 and the winding of the solenoid valve 226. Positive feedback through resistance 242 causes the turn-on of the valve 226 at a higher tank temperature than the turn-off temperature when sufficient cold water has entered the tank.

An example of components suitable for the variation of FIG. 14 include a type #741 integrated circuit for amplifier 238, 17.8k ohm resistor for resistance 234, a 2k ohm resistor for resistance 236, a 150k ohm resistor for resistance 242, 82 ohm resistors for resistances 250 and 254, and a 0.1 Mfd. capacitor for capacitance 256.

Another variation, illustrated in FIG. 15, of the solar heating system has a sun switch 270 connected across terminals 48 and 50 in parallel with the panel temperature sensor 44 which is located in the outlet of the solar panel 20 rather than directly in the panel 20. The sun switch 270 is illustrated as being mounted on the back of the solar panel so as not to be exposed to direct rays from the sun but rather to be exposed to indirect light.

Included in the switch 270 as shown in FIG. 16 is a light sensing NPN transistor 272 suitably exposed to ambient light and which is connected in series with a load resistance 274 between the terminal 50 and a junction 273; the emitter of the transistor 272 being connected to the junction with terminal 50. A transient suppressing filter capacitance 276 is connected across the transistor 272. Both inputs of a nand gate 278, i.e. a logic gate wherein the output is low or negative only when both inputs are high or positive, are connected to the collector of transistor 272. A feedback bias junction between resistances 280 and 282, which are serially connected between the output of gate 278 and junction 50, is connected to the base of the transistor 272.

The output of the gate 278 is connected to one input of a nand gate 284 which has an output connected to both inputs of a nand gate 286 with one side of a capacitance 292 connected to the output of gate 286 and with resistances 288 and 290 connected from the other side of capacitance 292 to the output and other input, respectively, of the gate 284; the gate 284 and 286 together with the resistances 288 and 292 and the capacitance 292 form a square wave oscillator. The output of gate 284 is connected to the counting input of a counter, such as a multistage binary counter 294, which has one output, such as a higher stage output, connected by a resistance 296 to the base input of Darlington transistor 298 which is coupled in series with a resistance 300 to a junction between one end of a resistance 301 and the cathode of a diode 302. The other end of the resistance 301 is connected to the junction 273 while the anode of the diode 302 is connected to the terminal 48. The values of the resistance 301 and other components connected to junction 273 are selected to avoid significant loading between terminals 48 and 50 in the absence of conduction of transistor 298. A zener diode 303 and parallel filter capacitance 305 are coupled across the junctions 273 and 50 to filter the voltage on terminal 273 and prevent any excess voltage. The resistance 300 has a value to decrease the resistance of parallel connected sensor 44 to a value indicating a substantially elevated temperature, but has a value less than that which would render the voltage on terminal 273 insufficient to operate the circuitry connected thereto.

A filter circuit, including a capacitance 304 with one side connected to the output of gate 286, a resistance 306 connected between the other side of capacitance 304 and the negative junction 50, a diode 308 having its anode connected to the junction between capacitance 304 and resistance 306, and a capacitance 310 coupled between the cathode of diode 312 and junction 50, is coupled by a nand gate 312 to the reset input of the counter 294. One input of gate 312 is connected to the cathode of diode 308 while the other input of gate 312 is connected to the positive junction 273. Conveniently the nand gates 278, 284, 286 and 312 are respective gates of a guad nand gate integrated circuit which has power inputs coupled across the junctions 50 and 273. The power inputs to the counter 294 are similarly connected across the junctions 50 and 273.

In operation of the variation of FIG. 15 when the light is sufficient to indicate substantially full sunlight conditions, the sun switch cycles on and off to alternately trigger the controller unit 36 to periodically operate the motor 30 and the pump 28. This periodic operation of the controller unit 36 occurs when the temperature of the sensor 44 is below a cutoff temperature for the sun switch 270 but sufficiently near to the required temperature differential above tank temperature. During the periodic operation, fluid from the solar panel 20 flows over the sensor 44; thus the sensor 44 senses the true panel temperature instead of only the temperature in the outlet which can be much lower.

Referring to FIG. 16 indirect sunlight on the transistor 272 renders the transistor 272 conductive which in turn lowers both inputs of gate 278 producing a high output which is fed back through resistance 280 to further increase the conductivity and provide a difference between the light intensity at which transistor 272 is rendered conductive and the light intensity at which the transistor 272 switches to the non-conductive state. The high output of gate 278 enables gate 284 initially producing a low output on gate 284 which in turn switches the output of gate 286 high. The charge on capacitance 292 momentarily holds the other input of gate 284 high until the charge is dissipated by current flow through resistance 288 to result in switching of the gates 284 and 286 into opposite states where they are again momentarily held by the charge on the capacitance 292. Thus the gates 284 and 286 oscillate and produce a square wave output which is filtered and detected by the capacitance 304, resistance 306, diode 308 and capacitance 310 to drive and hold the output of gate 312 and reset input of counter 294 low. With the reset input low, the counter 294 continuously counts the square wave pulses from gate 284. When a count is reached at which the output stage connected to resistance 296 is rendered high, the Darlington transistor 298 becomes conductive to connect the resistance 300 across terminals 48 and 50; thus the resistance sensed by the unit 36 between terminals 48 and 50 will correspond to a substantially higher temperature of the sensor 44. If this increased apparent panel temperature is sufficiently high, it will turn the controller on to operate the motor 30 and pump 28 in the same manner as decribed hereinabove in connection to operation when the sensed panel temperature exceeds the tank temperature by a predetermined differential. Thus where the temperature sensed by sensor 44 is a few degrees less than the true solar panel temperature which is at of near to being sufficient to turn the controller on, the flow of fluid from the panel 20 increases the temperature of the senser to the true panel temperature.

After a period of time determined by the period of oscillation and the selected output stage of counter 294, the transistor 298 is rendered non-conductive to remove the resistance 300 from the circuitry. Periodic operation of the transistor 298 continues so long as the voltage on line 273 is maintained sufficient to operate the gates and counter 294 and there is sufficient sunlight.

In the absence of sufficient sunlight, the input of gate 278 is high rendering gate 284 and the square wave oscillator inoperative. This produces a low on one input of gate 312 which applies a high to the reset input to counter 294 holding the counter 294 in its reset state with all outputs low.

When the temperature sensed by the sensor 44 reaches a relatively high level, its resistance drops to lower the voltage across terminals 48 and 50 to a level insufficient to operate the sun switch 270. Thus where the temperature of the fluid in the solar panel is relatively high the sun switch 270 is effectively removed from the circuit and does not significantly effect the operation of the controller unit 36. The diode 302 prevents damage in the event of a reversed connection of the sun switch 270 to the terminals 48 and 50.

In a specific example, the nand gates 278, 284, 286 and 312 are a type CD4011AE CMOS quad nand integrated circuit, the counter 294 is a type #CD4020AE CMOS 14 stage ripple counter, the transistor 272 is type #L14H2, and the Darlington transistor 298 is type #D16P1. The resistances 274, 280, 282, 288, 290, 306, 296, 300 and 301 are 10 M ohm, 10 M ohm, 680 k ohm, 12 M ohm, 22 M ohm, 1 M ohm, 4.7 M ohm, 12 k ohm and 1 M ohm resistors, respectively. The capacitances 276, 292, 304, 305 and 310 are 0.01 Mfd., 0.01 Mfd., 0.047 Mfd., 100 Mfd. and 0.001 Mfd. capacitors, respectively. The resistance 296 is connected to stage 13 of the counter 294. When operative the square wave oscillator has a period of about 150 milliseconds and the transistor 298 is periodically turned on for about 10 minutes and then off for about 10 minutes.

The apparent increase in the temperature sensed by sensor 44 when the resistance 300 of the above example is connected there across by the conduction of transistor 298 is illustrated by the curve 320 in FIG. 17. Above 71° C. (160° F.) the voltage on junction 273 is insufficient to operate the sun switch.

The period of the square wave oscillator can be increased by increasing the value of capacitance 292; for example a capacitance 292 of 1.0 Mfd. in the above example would increase the period to 1.5 seconds. Thus a counter 294 with fewer stages could be used.

Since many modifications, variations and changes in detail may be made to the above described enbodiment, it is intended that all matter in the foregoing description and shown in the accompanying drawings be interpreted as illustrative and not in a limiting sense.

What is claimed is:

1. A controller for a solar heating system which includes a solar collector, a storage tank and pump means for circulating fluid between the solar collector and the storage tank; the controller comprising:

a first temperature responsive resistance for sensing a temperature in the collector, a second temperature responsive resistance for sensing a temperature in the storage tank, said first fixed resistance connected to the other end of the first temperature responsive resistance in a first series circuit therewith, a second fixed resistance connected to the other end of the second temperature responsive resistance in a second series circuit therewith, said first and second series circuits forming a resistance bridge and adapted to be connected across a voltage source, said first temperature responsive resistance forming a first arm of said bridge, said first fixed resistance being included in a second arm of said bridge, said second temperature responsive resistance forming a third arm of said bridge; and said second fixed resistance forming the fourth arm of said bridge, switching means for connecting the pump means across a power source, and comparator means having inputs connected between the junction of the first and second arms of said bridge and the junction of the third and fourth arms of said bridge, and having an output connected to the switching means for operating the switching means whenever the first temperature responsive resistance senses a temperature which is different from the temperature sensed by the second temperature responsive resistance by a predetermined differential, said third arm of said bridge including means for linearizing said differential control function throughout a range of temperatures sensed by said second temperature responsive resistance.

2. A controller as claimed in claim 1 including positive feedback means connected to the comparator means for producing hysteresis in the operation of the comparator means.

3. A controller as claimed in claim 1 including
third and fourth fixed resistances connected in a third series circuit adapted to be energized by the voltage source, and
second comparator means having inputs connected between the junction of the first resistances and the junction of the third and fourth fixed resistances and having an output connected to the switching means for operating the switching means whenever the first temperature responsive resistance senses a temperature below a predetermined temperature near the freezing temperature of the fluid.

4. A controller as claimed in claim 3 wherein the first fixed resistance includes fifth and sixth serial resistances, and the third series circuit is connected at one end to the junction between the fifth and sixth resistances.

5. A controller as claimed in claim 3 including first and second positive feedback means connected to the respective first and second comparator means for producing hysteresis in the operation of the first and second comparator means.

6. A controller as claimed in claim 1 including
third and fourth fixed resistances connected in a third series circuit adapted to be energized by the voltage source,
second comparator means having inputs connected between the junction of the second resistances and the junction of the third and fourth resistances, and
interrupting means operated by the second comparator means and connected between the output of the first comparator means and the switching means for preventing operation of the switching means whenever the temperature sensed by the second temperature responsive resistance rises above a predetermined temperature.

7. A controller as claimed in claim 6 including first and second positive feedback means connected to the respective first and second comparator means for producing hysteresis in the operation of the first and second comparator means.

8. A controller as claimed in claim 1 wherein the switching means includes
a triac for connecting in series with the pump means, and
a relay having a winding connected to the output of the comparator means and having a pair of contacts connected to the control electrode of the triac for energizing the triac.

9. A controller as defined in claim 1 wherein said means for linearizing said controller comprises two resistances connected parallel in said third arm of said resistance bridge, a first of said parallel resistances being selected to linearize the differential control function at highly tank temperatures and the second of said parallel resistances being selected to linearize the differential control function at lower tank temperatures.

* * * * *